United States Patent
Navedo et al.

(10) Patent No.: US 7,246,505 B2
(45) Date of Patent: Jul. 24, 2007

(54) PERSONAL AIR CONDITIONING SYSTEM

(75) Inventors: Jose Enrique Navedo, Wichita, KS (US); James Michael Boenig, Seguin, TX (US)

(73) Assignee: The Coleman Company, Inc., Wichita, KS (US)

( * ) Notice: Subject to any disclaimer, the term of this patent is extended or adjusted under 35 U.S.C. 154(b) by 466 days.

(21) Appl. No.: 10/757,800

(22) Filed: Jan. 14, 2004

(65) Prior Publication Data

US 2005/0150251 A1    Jul. 14, 2005

(51) Int. Cl.
*F25D 3/02*    (2006.01)
(52) U.S. Cl. .............................. 62/420; 62/3.6; 62/425; 62/530
(58) Field of Classification Search ................. 62/420, 62/421, 419, 425, 3.6, 371, 530; 165/122, 165/47, 75

See application file for complete search history.

(56) References Cited

U.S. PATENT DOCUMENTS

| | | | | |
|---|---|---|---|---|
| 4,841,742 A * | 6/1989 | Biby | ............................ | 62/420 |
| 5,317,883 A * | 6/1994 | Newman | ...................... | 62/419 |
| 5,762,129 A | 6/1998 | Elliott | | |
| 6,325,137 B1 | 12/2001 | Elliott | | |
| 6,367,540 B1 | 4/2002 | Elliott | | |
| 6,401,483 B1 * | 6/2002 | Kopp | ........................... | 62/420 |
| 6,571,568 B1 * | 6/2003 | Link | ........................... | 62/244 |
| 6,751,963 B2 * | 6/2004 | Navedo et al. | ................... | 62/6 |

* cited by examiner

*Primary Examiner*—Melvin Jones
(74) *Attorney, Agent, or Firm*—Leydig, Voit & Mayer, Ltd

(57) ABSTRACT

A personal air conditioning system that may be used, for example, to cool a tent. The personal air conditioning system includes a cooling lid that fits over a typical insulated cooler. The cooling lid includes a heat transfer tower that is configured to transfer heat from a cold medium, such as ice, that is located within the cooler to an area within the cooling lid. A heat sink is provided at the top of the heat transfer tower and at least partially within the cooling lid. A fan is configured to draw air into the cooling lid, across the heat sink, and out of the cooling lid. The cooled air may then be used for cooling of a tent or other compartment, for example, or may be directed to blow on an individual.

20 Claims, 1 Drawing Sheet

PERSONAL AIR CONDITIONING SYSTEM

TECHNICAL FIELD OF THE INVENTION

The present invention relates to air cooling systems, and more specifically to a portable air cooling system.

BACKGROUND OF THE INVENTION

Camping is a popular recreational activity enjoyed by many. Some people camp so that they may enjoy the outdoors, and others use camping as an inexpensive alternative to staying in a hotel.

Camping can be uncomfortable, however, when temperatures are too hot, for example during the summer in the Southern United States. Although current tent designs permit air to be vented through the tent, if that air is at too high of a temperature, then the tent's occupants will not experience much cooling. Although fans work well to circulate air, a fan that is sizable enough to circulate a significant amount of air requires a considerable amount of power, and such a power supply is seldom available at a campsite.

SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In accordance with an embodiment, a personal air conditioning system is provided that may be used, for example, to cool a tent. The personal air conditioning system includes a cooling lid that fits over a typical insulated cooler. Thus, in accordance with an embodiment, the existing lid for an insulated cooler is removed, and the cooling lid is installed in its place.

The cooling lid includes a heat transfer tower that is configured to transfer heat from a cold medium, such as ice, that is located within the cooler to an area within the cooling lid. A heat sink is provided at the top of the heat transfer tower and at least partially within the cooling lid. A fan is configured to draw air into the cooling lid, across the heat sink, and out of the cooling lid. The cooled air may then be used for cooling of a tent or other compartment, for example, or may be directed to blow on an individual.

Other features of the invention will become apparent from the following detailed description when taken in conjunction with the drawings, in which:

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
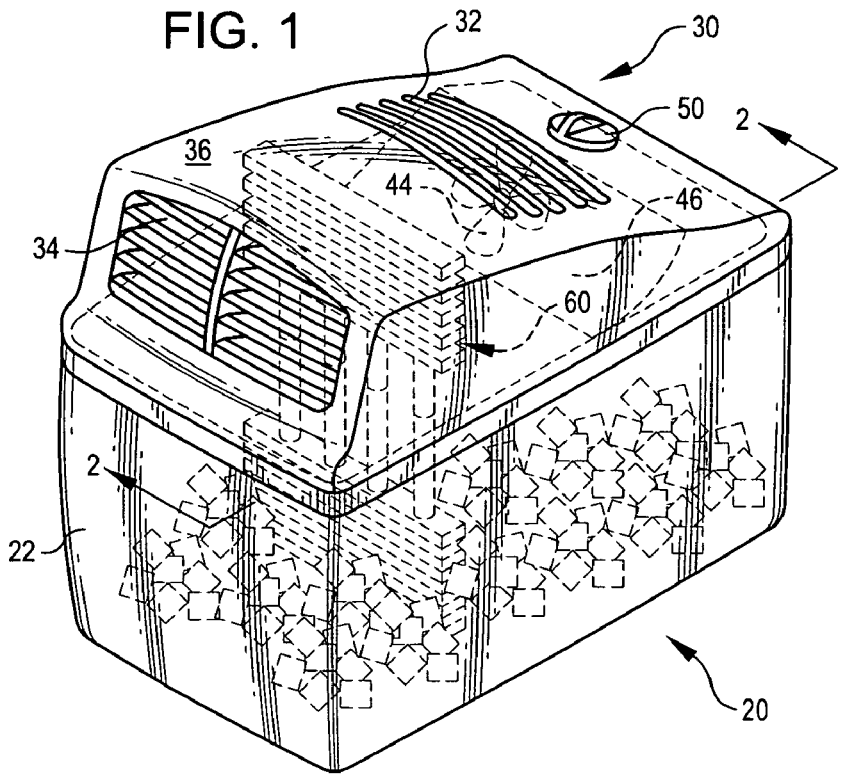
FIG. 1 is a side perspective view of a personal air conditioning system in accordance with an embodiment.
Figure 2:
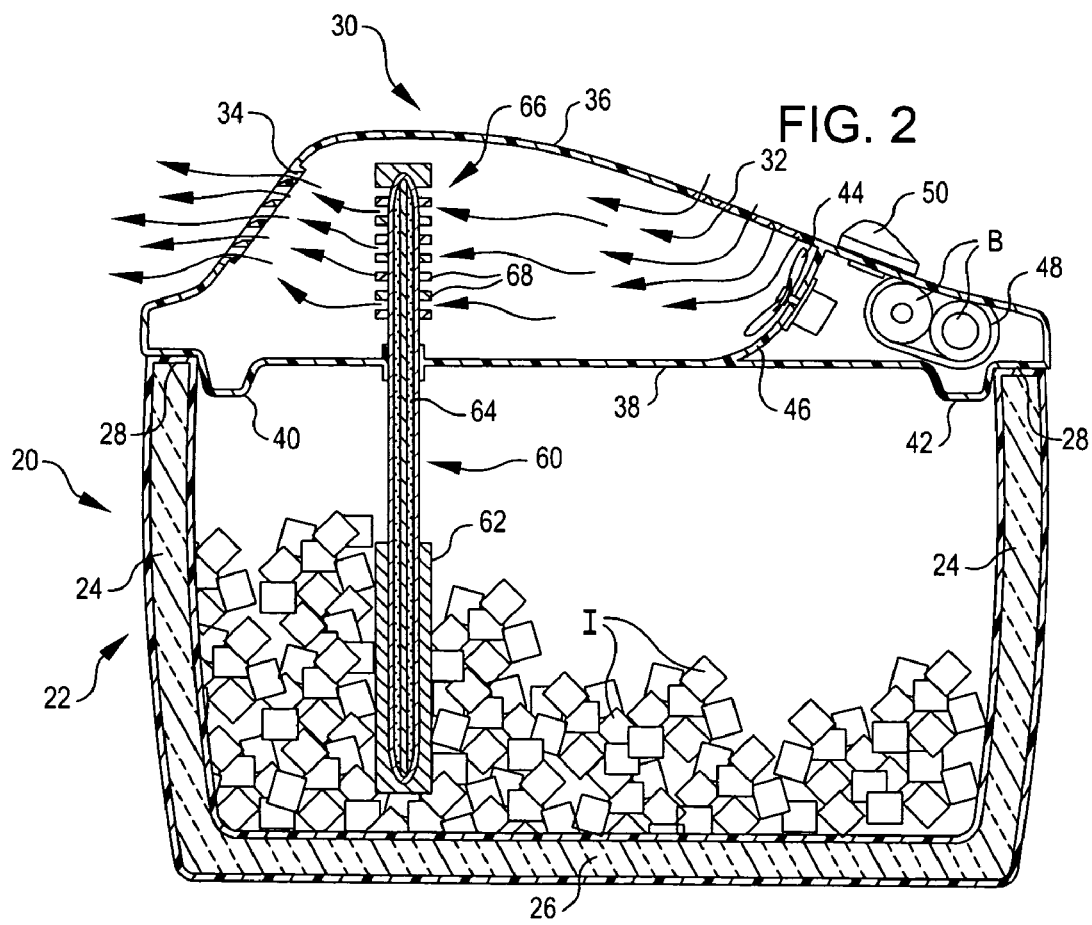
FIG. 2 is a sectional view along the section lines 2-2 of FIG. 1.

Referring now to the drawings, in which like reference numerals represent like parts throughout the several views, FIG. 1 shows a personal air conditioning system 20 in accordance with an embodiment. The personal air conditioning system 20 in the embodiment shown includes an insulated cooler 22, such as a standard 25 liter (26 quart) insulated cooler. As can be seen in FIG. 2, the insulated cooler 22 includes side walls 24, a bottom 26, and a top rim 28. A structure such as the insulated cooler 22 is well known, and its construction will not be described here so as not to obscure the invention. However, in general, the insulated cooler 22 is of a standard configuration, having the side walls 24 and the bottom 26 insulated. The insulated cooler 22 may include a flat lid (not shown). If so, in accordance with an embodiment, the lid is removed so that the insulated cooler 22 may be used in the personal air conditioning system 20. Alternatively, the insulated cooler 22 may be especially configured for use in the personal air conditioning system 20. Also, the system described may be altered to be used with many different configurations of insulated containers, including but not limited to beverage coolers, water coolers, and jugs.

In accordance with an embodiment, the personal air conditioning system 20 includes a cooling lid 30 configured so that it may be arranged on the top rim 28 of the insulated cooler 22. The cooling lid 30 includes an intake vent 32 toward a rear, top portion of the cooling lid 30. An outlet vent 34 is located at a front portion of the cooling lid 30. A top wall 36 extends along the upper portion of the cooling lid 30 and may be configured as desired. A bottom wall 38 is spaced from the top wall 36 and in the embodiment shown extends parallel to the bottom 26 of the insulated cooler 22.

The top wall 36 and the bottom wall 38 form an enclosure within the cooling lid 30. In accordance with an embodiment, the only two openings to the enclosure are the intake vent 32 and the outlet vent 34.

Protrusions 40, 42 extend downward from the bottom wall 38 and are positioned so that they can abut against the inner surfaces of the top rim 28 of the insulated cooler 22 when the cooling lid 30 is installed on the top rim 28. The protrusions 40, 42 stabilize the cooling lid 30 into position, and prevent the cooling lid 30 from inadvertently sliding off of the top rim 28.

A fan 44 is positioned between the top wall 36 and the bottom wall 38 of the cooling lid 30. In the embodiment shown, the fan 44 is mounted on a rear wall 46 that extends upward between the bottom wall 38 and top wall 36. However, the fan 44 may be positioned in other places on or within the cooling lid 30 and preferably is aligned so that it can direct an air flow into the intake vent 32 and out of the outlet vent 34.

A battery pack 48 is provided as a power source for the fan 44. In the embodiment shown in FIG. 2, the battery pack 48 is mounted between the top wall 36 and the bottom wall 38 at a rear portion of the cooling lid 30. However, the battery pack 48 may be positioned at other locations within the cooling lid 30 or may be otherwise associated therewith. The battery pack 48 may include, for example, receptacles for receiving two D-cell batteries B, although other batteries and/or configurations may be used. In addition, other power sources may be used for powering the fan 44, for example solar.

A control knob 50 is mounted on the top surface of the top wall 36 and is wired to the fan 44 and the battery pack 48 to control operation of the fan 44. In accordance with an embodiment, the control knob 50 is simply an On-and-Off switch. However, if desired, the control knob 50 may include several settings representing different speeds at which the fan 44 may operate. Different controls may be used including, but not limited to, a remote control and/or a thermostat.

In accordance with an embodiment, the cooling lid 30 includes a heat transfer tower 60 extending from inside the insulated cooler 22 to inside the cooling lid 30. For example, the heat transfer tower 60 may extend to a position adjacent to the bottom of the insulated cooler 22, and to a position adjacent to the top wall 36 of the cooling lid 30, as is shown in FIG. 2. The heat transfer tower is configured to transfer heat between the lid 30 and the insulated cooler 22 without requiring additional work being added to the system, such as a pump.

In accordance with an embodiment, the heat transfer tower 60 includes a cold block 62 at its lower portion. The cold block 62 may be any suitable structure, but in one embodiment is a block of thermally conductive metal, such as aluminum.

In accordance with an embodiment, a heat pipe 64 extends upward from the cold block 62 to within the cooling lid 30. Although referred to herein as a "heat pipe 64," the heat pipe 64 may be one or more heat pipes providing the functions described herein. As is known, a heat pipe is a device that quickly transfers heat from one point to another. Heat pipes are often referred to as "super conductors" of heat as they possess an extraordinary heat transfer capacity and rate with almost no heat loss.

A heat pipe includes a container, a working fluid, and a wick or other capillary structure. In general, the wick and working fluid are mounted in the container, and the working fluid moves along the wick to transfer heat. During this process, the working fluid evaporates at a heated end called the evaporator and condenses toward a cooler end called the condenser.

The heat pipe container may be a variety of materials, but in general is designed to isolate the working fluid from the outside environment. Therefore, the heat pipe container is leak-proof and should be capable of maintaining the pressure differential across its walls, and to enable the transfer of heat to take place from and into the working fluid.

The working fluid chosen for a given application depends upon the operating vapor temperature range of the application. In general, the personal air conditioning system 20 will likely operate at ambient temperatures of up to 120 degrees Fahrenheit or higher, with the inside of the insulated cooler 22 typically kept at approximately freezing level (32 degrees Fahrenheit) or thereabout, depending upon the cooling medium used. The working fluid can be chosen for a given temperature range by a person of skill in the art.

The wick may be a porous structure made of a metal, such as steel, aluminum, nickel or copper, in various ranges of pore sizes. The porous structure is fabricated using metal foams, and particularly felts. Fibrous materials, like ceramics, may also be used. The quality and type of wick usually determines the performance of the heat pipe. Different types of wicks may be used depending upon the application for which the heat pipe is being used. The selection of the wick for a heat pipe depends on many factors, several of which are closely linked to the properties of the working fluid. Again, a wick and working fluid combination may be chosen by a person of ordinary skill, and in fact many off the shelf heat pipes may be purchased for a given temperature operating range. For example, Thermacore International, Inc., a subsidiary of Modine Manufacturing Company, provides a number of different heat pipes.

The prime purpose of the wick is to generate capillary pressure to transport the working fluid from the condenser to the evaporator. The wick should also distribute the working fluid around the evaporator section to any area where heat is likely to be received by the heat pipe 64.

The atmosphere inside the heat pipe is set by an equilibrium of liquid and vapor for the working fluid. As heat enters at the evaporator, this equilibrium is upset, generating vapor at a slightly higher pressure. This higher pressure vapor travels to the condenser end where the slightly lower temperatures cause the vapor to condense giving up its latent heat of vaporization. The condensed fluid is then pumped back to the evaporator by the capillary forces in the wick structure.

This continuous cycle transfers large quantities of heat with very low thermal gradients. A heat pipe's operation is passive, being driven only by the heat that is transferred. This passive operation results in high reliability and long life.

Heat pipes have an effective thermal conductivity many thousands times that of copper. The heat transfer or transport capacity of a heat pipe is specified by its "Axial Power Rating (APR)". The larger a heat pipe diameter, the greater the APR. Similarly, the longer the heat pipe, the lesser the APR. Heat pipes can be built to be almost any size and shape. In accordance with an embodiment, the heat pipe 64 of the embodiment shown in the drawing includes three heat pipes, each having a diameter of ¾ inch. Each of these heat pipes includes copper as the container material, water as the working fluid, and sintered powder as the wick or capillary structure. A person of ordinary skill in the art of heat transfer could vary these parameters for a desired heat transfer effect.

A heat sink 66 is positioned at the top of the heat pipe 64. The heat sink 66 is a substance or a device for the absorption or dissipation of heat. Any heat dissipating structure may be used. As one example, in the embodiment shown, the heat sink 66 includes seven thermally conductive fins 68 extending horizontally.

In operation, the cold block 62 is positioned within a cold medium, such as ice I. Other cold mediums may be used, such as cold water, frozen ice packs, dry ice, or other cold items. However, ice I works well in accordance with an embodiment, because it is typically readily available, such as from a convenient store, and is inexpensive.

The cold block 62 dissipates heat into (i.e., absorbs the cold temperatures of) the cold medium, such as the ice I. The cold temperatures absorbed by the cold block 62 are transferred by convection to the heat pipe 64. To this end, the heat pipe may be attached to or mounted in the cold block 62. The heat pipe 64, because of its superior thermal conductivity properties, quickly transfers the colder temperatures to the heat sink 66.

The control knob 50 is operated to turn on the fan 44. The fan 44 draws air in through the intake vent 32 and expels air out of the outlet vent 34. The heat sink 66 is positioned along this path, and thus air traveling between the intake vent 32 and the outlet vent 34 travels across and/or through the heat sink 66. The heat sink 66 absorbs some of the heat of the air, and a cooler stream of air exits the opposite side of the heat sink 66 and then exits the insulated cooler 22 out of the outlet vent 34. In this manner, cooled air is supplied out of the outlet vent 34.

The cooled air may then be used for cooling of a tent or other compartment, for example. Alternatively, the cooled air may be used to directly cool a person, animal, or other item.

A number of variations for the heat transfer tower 60 are possible. First, the cold block 62 may not be used, but instead the heat pipe 64 may be inserted directly into the cold medium or ice I. However, the cold block 62 provides an increased size structure for dissipating heat into (i.e., absorbing the cold from) the cold medium. The cold block 62 also provides a structure in which the heat pipe 64 may be mounted.

The heat pipe 64 may be substituted with another device or structure that is capable of efficiently transferring heat. As examples, a thermosyphon or another heat transfer device may be used. However, if a thermosyphon is used, because cooler temperatures must travel downward in a thermosyphon, the components in the cooling lid 30 would need to be mounted below the insulated cooler 22, which is a less efficient design for the personal air conditioning system 20.

The heat transfer tower 60 may be designed without a separate structure for the heat sink 66 located at its upper end, but instead may include just the upper end of the heat pipe 64 across which the air flowing through the cooling lid 30 would travel. In such an embodiment, the upper ends of the heat pipe serve as the heat sink. Although such a structure would work to cool air flowing through the cooling lid 30, the fins 68 of the heat sink 66 provide a greater surface area, further increasing the cooling effect provided by the heat transfer tower 60.

The personal air conditioning system 20 may also utilize other containers for holding a cold medium, and is not limited to the insulated cooler 22. In addition, if desired, the concepts of the invention may be used without the cooling lid 30, wherein a fan is mounted for direct blowing over the heat sink 66.

Tests with an embodiment of a personal air conditioning system 20 in accordance with an embodiment have provided cooling to a tent over a ten-hour period. In the tests, the insulated cooler 22 was filled with approximately 30 pounds of ice. The heat pipe 64 was the structure described above, and the tent was a COLEMAN 3-person tent. The personal air conditioning system 20 provided a drop of temperature within the tent of ten degrees Fahrenheit for ten hours before all of the ice was melted. As can be understood, a greater drop in temperature may be provided, but would not be able to be sustained over as long a period of time. However, it has been found that a drop in temperature of ten degrees is sufficient for comfort to be felt within a tent and such a temperature change significantly reduces the discomfort felt when ambient temperatures are above 80 degrees Fahrenheit.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An air conditioning systems comprising:
    a container for receiving a cold medium;
    a cooling lid for fitting over the container, the cooling lid comprising:
        an enclosure comprising an intake vent and an outlet vent;
        a heat sink mounted in the enclosure;
        a fan for drawing air through the enclosure and across the heat sink; and
        at least one heat pipe extending between the heat sink and a first location within the interior of the container.

2. The air conditioning system of claim 1, further comprising a cold block mounted on the heat pipe at the first location.

3. The air conditioning system of claim 1, wherein the container comprises an insulated cooler.

4. The air conditioning system of claim 1, wherein the fan is battery powered.

5. The air conditioning system of claim 4, wherein batteries for powering the fan are mounted in the cooling lid.

6. An air conditioning system, comprising:
    a container for receiving a cold medium;
    a heat pipe having first and second locations thereon, the first location extending into the container;
    a heat sink at the second location; and
    a fan mounted to direct air over the heat sink.

7. The air conditioning system of claim 6, wherein the fun and heat sink are mounted in an enclosure.

8. The air conditioning system of claim 7, wherein the enclosure comprises an intake vent and an outlet vent.

9. The air conditioning system of claim 6, wherein the enclosure is formed within a lid that fits on top of the container.

10. The air conditioning system of claim 6, further comprising a cold block mounted on the heat pipe at the first location.

11. The air conditioning system of claim 6, wherein the container comprises an insulated cooler.

12. An air conditioning system, comprising:
a container far receiving a cold medium;
a cooling lid for fitting over the container, the cooling lid comprising:
a heat sink;
a fan for drawing air across the heat sink; and
a heat pipe extending between the heat sink and a first location within the inter or of the container.

13. The air conditioning system of claim 12, further comprising a cold block mounted on the heat pipe at the first location.

14. The air conditioning system of claim 12, wherein the container comprises an insulated cooler.

15. The air conditioning system of claim 12, wherein the fan is battery powered.

16. The air conditioning system of claim 15, wherein batteries for powering the fan are mounted in the cooling lid.

17. The air conditioning system of claim 12, wherein the fan is solar powered.

18. The air conditioning system of claim 3, wherein the insulated cooler is either a beverage cooler or a water cooler.

19. The air conditioning system of claim 11, wherein the insulated cooler is either a beverage cooler or a water cooler.

20. The air conditioning system of claim 14, wherein the insulated cooler is either a beverage cooler or a water cooler.

* * * * *